United States Patent
Light (10) Patent No.: US 9,571,477 B2
(45) Date of Patent: Feb. 14, 2017

(54) MECHANISM FOR FACILITATING REMOTE ACCESS OF USER AND DEVICE CREDENTIALS FOR REMOTING DEVICE ACTIVITIES BETWEEN COMPUTING DEVICES

(75) Inventor: John J. Light, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 210 days.

(21) Appl. No.: 13/977,679

(22) PCT Filed: Sep. 30, 2011

(86) PCT No.: PCT/US2011/054387
§ 371 (c)(1),
(2), (4) Date: Jun. 29, 2013

(87) PCT Pub. No.: WO2013/048472
PCT Pub. Date: Apr. 4, 2013

(65) Prior Publication Data
US 2013/0288648 A1    Oct. 31, 2013

(51) Int. Cl.
*H04M 3/00*    (2006.01)
*H04L 29/06*   (2006.01)
*G06F 9/46*    (2006.01)
*H04W 12/08*   (2009.01)
*H04M 1/00*    (2006.01)

(52) U.S. Cl.
CPC .............. *H04L 63/08* (2013.01); *G06F 9/468* (2013.01); *H04W 12/08* (2013.01); *G06F 2209/549* (2013.01)

(58) Field of Classification Search
CPC ............ H04M 1/72533; H04M 1/7253; H04M 225/02
USPC .......................................................... 455/418
See application file for complete search history.

(56) References Cited

U.S. PATENT DOCUMENTS

| 7,773,972 | B2 * | 8/2010 | Croome et al. ............... 455/411 |
| 7,822,857 | B2 | 10/2010 | Cartes et al. |
| 2006/0183462 | A1 | 8/2006 | Kolehmainen |
| 2006/0293028 | A1 | 12/2006 | Gadamsetty et al. |

(Continued)

FOREIGN PATENT DOCUMENTS

| CN | 101043528 | 9/2007 |
| WO | WO-2007/001629 | 1/2007 |

OTHER PUBLICATIONS

Taiwan IPO Search Report, Taiwan Invention Patent Application No. 101132010, Translation of Taiwan Office Action and Taiwan IPO Search Report, Mailed Sep. 18, 2014, 8 pages.

(Continued)

*Primary Examiner* — Huy C Ho
(74) *Attorney, Agent, or Firm* — Blakely, Sokoloff, Taylor & Zafman LLP (57) ABSTRACT

A mechanism is described for facilitating remote access of device and user credentials for at computing devices according to one embodiment of the invention. A method of embodiments of the invention includes remotely accessing, by a first computing device, credentials of a second computing device. The credentials may facilitate the first computing device to perform one or more tasks. The method may further include performing, at the first computing device, the one or more tasks based on the accessed credentials and according to capabilities of the first computing device.

18 Claims, 5 Drawing Sheets

(56) References Cited

U.S. PATENT DOCUMENTS

2010/0169432 A1 7/2010 Santori, Jr. et al.
2010/0293607 A1 11/2010 Hall et al.
2011/0112969 A1 5/2011 Zaid

OTHER PUBLICATIONS

PCT/US2011/054387, PCT Notification of Transmittal of the International Search Report and the Written Opinion of the International Searching Authority, or the Declaration, Mailed May 30, 2012, 8 pages.
Taiwan IPO Search Report, Taiwan Invention Patent Application No. 101132010, Translation of Taiwan IPO Search Report, Taiwan Patent Application No. 101132010, Mailed May 8, 2015, 1 page.
Office Action from Counterpart CN Patent Application No. 201180073762.9, Mailed Nov. 30, 2015, 7 pages.

\* cited by examiner

MECHANISM FOR FACILITATING REMOTE ACCESS OF USER AND DEVICE CREDENTIALS FOR REMOTING DEVICE ACTIVITIES BETWEEN COMPUTING DEVICES

CROSS-REFERENCE TO RELATED APPLICATION

This patent application is a U.S. National Phase Application under 35 U.S.C. §371 of International Application No. PCT/US2011/054387, filed Sep. 30, 2011, entitled MECHANISM FOR FACILITATING REMOTE ACCESS OF USER AND DEVICE CREDENTIALS FOR REMOTING DEVICE ACTIVITIES BETWEEN COMPUTING DEVICES.

FIELD

The field relates generally to computing devices and, more particularly, to employing a mechanism for facilitating remote access of user and device credentials for remoting device activities between computing devices.

BACKGROUND

With the rise in the use of mobile computing devices (e.g., smartphones, etc.), it is becoming increasingly important to the user to be able to use a mobile device freely and for longer periods of time without having to continuously burden or rely on the mobile device's own components (e.g., battery, antenna, etc.). Certain conventional techniques provide for connecting multiple devices (such as connecting a cellular phone with a hands-free device installed in a car, etc.) through a Bluetooth connection. Although these conventional techniques facilitate the hands-free device to relay certain communication (e.g., the user's voice, etc.) on behalf of the cellular phone, they, nevertheless, leave the essential cellular activity burden (e.g., cellular radio activity, cellular antenna activity, such as needing to penetrate through the car metal and water bags (e.g., human beings), etc.) on the cellular phone.

BRIEF DESCRIPTION OF THE DRAWINGS

Embodiments of the present invention are illustrated by way of example and not by way of limitation in the figures of the accompanying drawings, in which like references indicate similar elements and in which.

DETAILED DESCRIPTION

Embodiments of the invention provide a mechanism for facilitating remote access of device and user credentials at computing devices according to one embodiment of the invention. A method of embodiments of the invention includes remotely accessing, by a first computing device, credentials of a second computing device. The credentials may facilitate the first computing device to perform one or more tasks. The method may further include performing, at the first computing device, the one or more tasks based on the accessed credentials and according to capabilities of the first computing device.

Furthermore, a system or apparatus of embodiments of the invention may provide the mechanism for facilitating remote access of device and user credentials and facilitate the aforementioned processes and other methods and processes described throughout the document. For example, in one embodiment, an apparatus of the embodiments of the invention may include a first logic to perform the aforementioned remotely accessing credentials, a second logic to perform the aforementioned performing of the one or more tasks, and the like, such as other or the same set of logic to perform other processes and/or methods described in this document.

In one embodiment, a first computing device remotely access credentials of a second computing device to, for example, use the second computing device to perform one or more functions at the second computing device for any number of reasons, such as the one or more functions are not available at the first computing device, to reduce the use of the first computing device to save its battery life, achieve more efficiency or better signal by, for example, having the second computing device use its better antenna, save money by needing and having only one plan (e.g., data plan, phone plan) for both computing devices, and the like. In one embodiment, with remote credentials, the second computing device may be used to perform any number of functions based on its capabilities (e.g., phone capabilities, data capabilities, etc.) and the limitations of the remote credentials. It is to be noted that this process of remotely lending and/or borrowing of credentials at two or more computing device is sometimes referred to as "remoting" throughout this document.

For example, the first computing device may be a tablet computer having access to data but no phone capability, while the second computing device may be a dumb cellular phone having phone access but no data capability. In one embodiment, the tablet may borrow credentials from the dumb cellular phone to perform data activities (e.g., accessing the Internet) which the cellular phone is incapable of doing. In this case, one advantage is that the Internet data does not have to pass through the dumb cellular phone and that can prevent the running down of the cellular phone's battery while the table is accessing the Internet.

Considering another example, a car includes a full-capacity cellular car phone ("car phone"), but having a personal cellular phone ("user phone"), the user may not want to spend money on having a particular plan (e.g., a data plan, a phone/voice plan, etc.) on both the car phone and the user phone. A data plan may include access to the Internet, email, etc., while a phone/voice may include access to phone calls, texting, etc. A phone/voice plan may be provided by a base phone/data service provider (e.g., AT&T®, Verizon®, etc.) or a third-party plan/application (e.g., Skype®, Tango®, etc.), or the like. In this case, for example and in one embodiment, when in the car and the user phone within a predefined range (e.g., 4 feet) of the car phone, the car phone may borrow the necessary and/or relevant credentials of and from the user phone to allow the user access to data (e.g., accessing the Internet, checking email, etc.) and/or phone (e.g., placing/receiving phone calls, sending/receiving texts, etc.) using the car phone; consequently, for the time the user is within the predefined range using the car phone, the battery load and the use of the user phone is significantly reduced.

Figure 1:
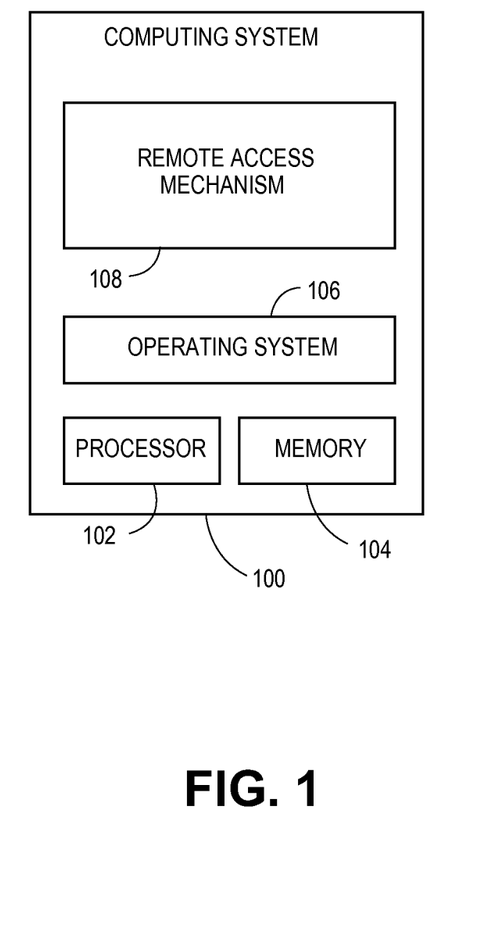
FIG. 1 illustrates a computing device employing a remote access mechanism for facilitating remote access of user and device credentials at computing devices according to one embodiment of the invention.

FIG. 1 illustrates a computing device employing a remote access mechanism for facilitating remote access of user and device credentials at computing devices according to one embodiment of the invention. In one embodiment, a computing device 100 is illustrated as having a remote access mechanism 108 to facilitate remote access of user and device credentials at and between multiple computing devices. Computing device 100 may include mobile computing devices, such as cellular phones including dumb cellular phones, smartphones (e.g., iPhone®, BlackBerry®, etc.), handheld computing devices, personal digital assistants (PDAs), etc., tablet computers (e.g., iPad®, Samsung® Galaxy Tab®, etc.), laptop computers (e.g., notebooks, netbooks, etc.), e-readers (e.g., Kindle®, Nook®, etc.), etc. Computing device 100 may further include set-top boxes (e.g., Internet-based cable television set-top boxes, etc.), and larger computing devices, such as desktop computers, server computers, etc.

Computing device 100 includes an operating system 106 serving as an interface between any hardware or physical resources of the computer device 100 and a user. Computing device 100 further includes one or more processors 102, memory devices 104, network devices, drivers, or the like, as well as input/output sources, such as touchscreens, touch panels, touch pads, virtual or regular keyboards, virtual or regular mice, etc. It is to be noted that terms like "machine", "device", "computing device", "computer", "computing system", and the like, are used interchangeably and synonymously throughout this document.

Figure 2:
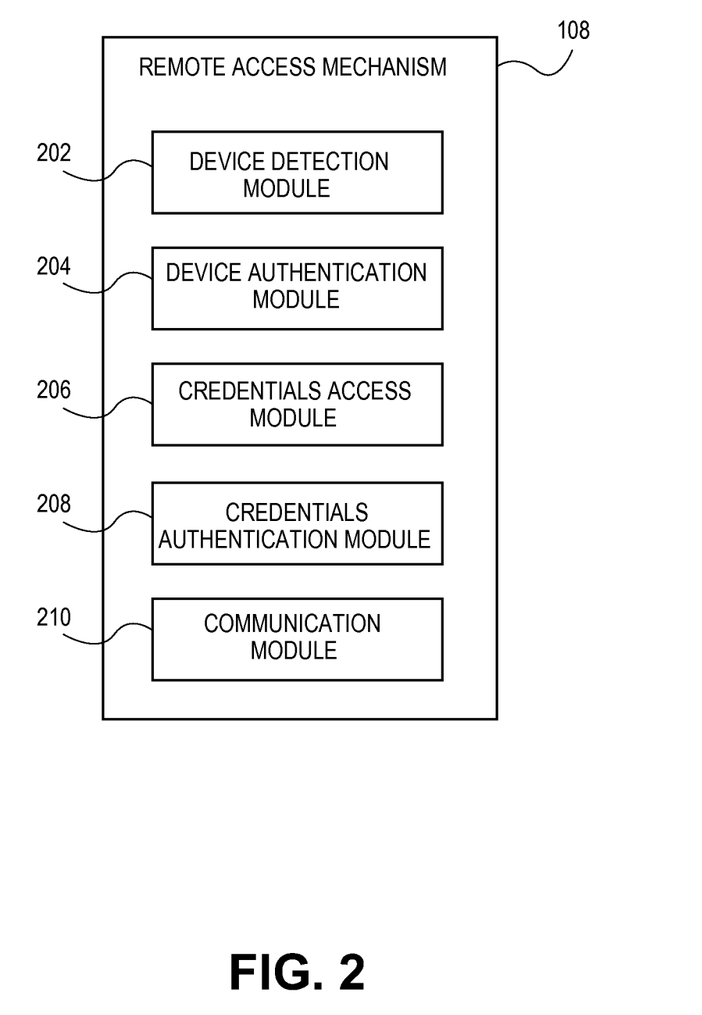
FIG. 2 illustrates a remote access mechanism employed at a computing device according to one embodiment of the invention.

FIG. 2 illustrates a remote access mechanism employed at a computing device according to one embodiment of the invention. In one embodiment, the remote access mechanism 108 includes various components 202-212 to facilitate remote access to user and device credentials at or between multiple computing devices (e.g., mobile computing devices, such as cellular phones, smartphones, etc.). In the illustrated embodiment, the remote access mechanism 108 provides a device detection module 202 to detect a corresponding computing device available for credential sharing. The detected computing device may then be authenticated or verified using a device authentication module 204 of the remote access mechanism 108.

Once the detected computing device is identified and verified, a credentials access module 206 may contact, ping or solicit the detected computing device for device and/or user credentials (e.g., the detected computing device's identification, wireless credentials (e.g., access to data plan, data plan details, wireless service provider, etc.), telephone credentials (e.g., voice service provider, access to voice plan, plan details, etc.), third-party credentials (e.g., Skype, Tango, etc.), user profile (e.g., owner/user profile, associated user profiles (e.g., profiles of family members, friends, etc.), nature of the plan (e.g., family plan, individual plan, etc.)), etc.). In one embodiment, accessing or sharing the credentials leads the detected computing device to essentially borrow the other computing device, such as to have the other computing device perform one or more functions that may not be present at the detected computing device, or may be present but not used (e.g., to save battery at the detected computing device, access a bigger screen at the other computing device, etc.). This will be further described with reference to FIG. 3. In one embodiment, using a credentials authentication module 208, some of the relevant credentials (e.g., user profile, etc.) may be verified and/or authenticated. Any communication of credentials, messages, data, etc. may be performed using a communication module 210, while any displaying of such or other information may be done using user interfaces provided at the two devices. Further, a communication link between the two computing devices may be maintained in order for the remoting of the credentials to remain active and that the borrowed credentials not invalidated.

It is contemplated that any number and type of components may be added to and removed from the remote access mechanism 108 to facilitate the workings and operability of the remote access mechanism 108. For brevity, clarity, ease of understanding and to focus on the remote access mechanism 108, many of the default or known components of a mobile computing device are not shown or discussed here.

Figure 3:
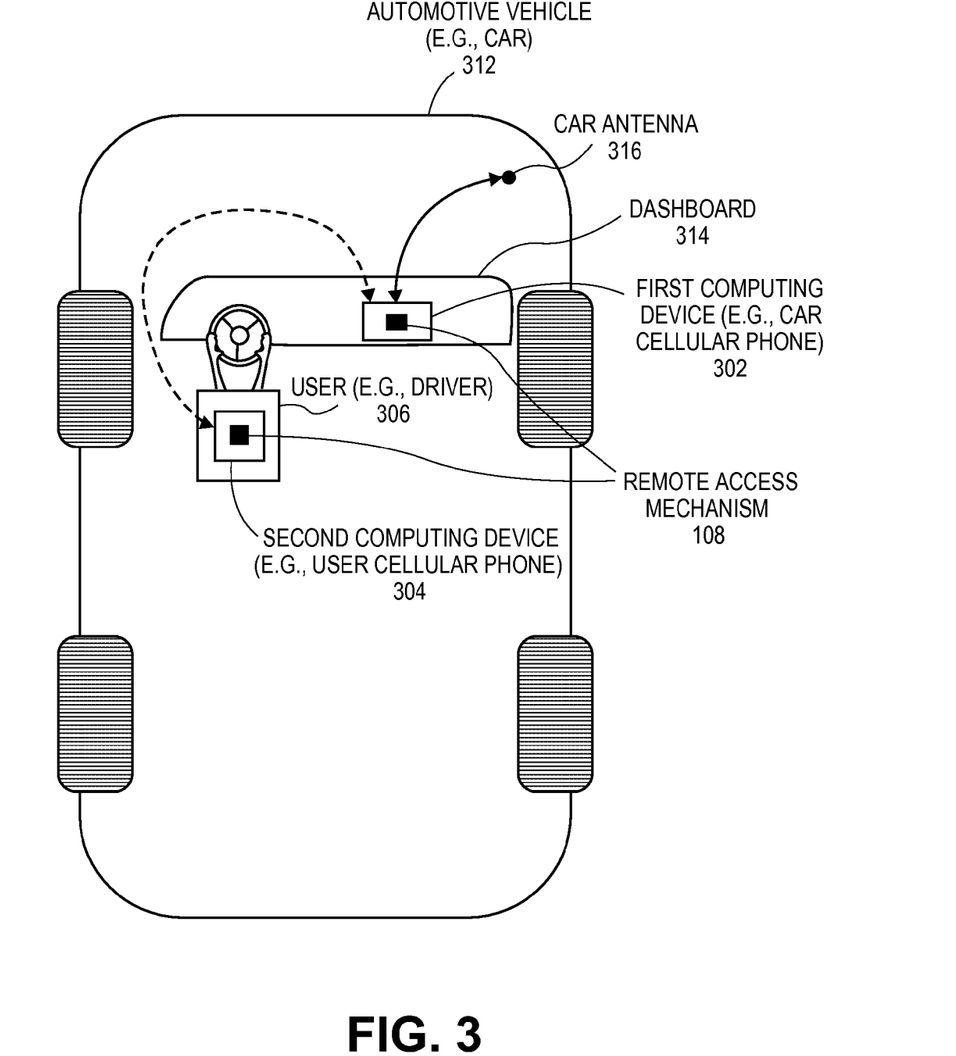
FIG. 3 illustrate a remote access mechanism facilitating remote access of user and device credentials at computing devices according to one embodiment of the invention.

FIG. 3 illustrates a remote access mechanism facilitating remote access of user and device credentials at computing devices according to one embodiment of the invention. In the illustrated embodiment, the cellular phone technology is used as an example for brevity, clarity, simplicity, and ease of understanding. It is contemplated that embodiments of the invention are not limited to the illustrated cellular phone technology or the way the credentials or services are used here and that the embodiments are compatible and workable with any range of technologies, including dumb cellular phones, smartphones, PDAs, handheld computing devices, tablet computers, e-readers, notebooks, netbooks, servers, personal computers (PCs), set-top boxes, etc.

In one embodiment and for example, a user 306 (e.g., a driver, a passenger, etc.) wishes to use a second computing device 304 (e.g., user cellular phone) in an automobile 312 (e.g., car) by sharing its credentials with a first computing device 302 (e.g., car cellular phone) that is installed in a car 312 (e.g., installed at the dashboard 314 of the user's car 312). In the illustrated embodiment, both the first and second computing devices 302, 304 employ the remote access mechanism 108.

For example, as the user 306 enters the car 312 with the user cellular phone 304 and wishes to use one or more features or functionalities of the car cellular phone 302, such as to use a particular feature (e.g., data capability, phone capability, etc.) of the car phone 302 because that feature may not be available at the user phone 304 or even if the feature is available at the user phone 304, the user may nevertheless wish to use it through the car phone 302 to save battery at the user phone 304 or receive better reception at the car phone 302 (e.g., the car phone can access the external car antenna), or the like. For example, the car phone 302 may be a full smart cellular phone (e.g., having phone and data capabilities) and although the user phone 304 may also have the same or similar capabilities, the user phone 304 credentials (e.g., including its data plan and relevant information) are provided to the car phone 302 so that the user 306 may, for example, access the Internet on the car phone 302 because, for example, the car phone 302 has a bigger display screen or to converse battery live at the user phone 304, etc. Further, in this case, remoting the user phone credentials to the car phone 302 may mean not having to worry about having the user phone 304 to penetrate through a great deal of shielding, such car material (e.g., metal, plastic, glass, etc.), bags of water (the term refers human beings, such as the user 306 and possibly other passengers in the car), other things in, on, or around the user phone 306 in the car 312, because the car phone 302 may access the external car antenna 316 which the user phone 304 may not.

In one embodiment, the car phone 302 detects the user phone 304 as soon as the user phone 304 is within a particular predefined range (e.g., a range that is user-defined or user-determined, such as 5 feet, etc., or an automatic range, such as the Bluetooth range) of the car phone 302. Once the user phone 302 has been detected, the car phone 302 then verifies the user phone 304, such as compare the basic information of the user phone 304 (e.g., serial number, assigned name, user name, etc.) against the information that is on file and accessible to the car phone 302. If the user phone 302 is not verified, it is rejected by the car phone 302; however, in case of the user 306 or the user phone 304 new, the user 306 is given the opportunity to register self and the user phone 304 with the car phone 302 for future authentication. This authentication process can be removed or turned off by the user. Once the two phones 302, 304 are within a predefined range, the car phone 302 may automatically solicit credentials from the user phone 304. Once the credentials are made accessible to and/or received at the car phone 302, the credentials may be securely authenticated.

As aforementioned, once the user phone credentials become accessible to the car phone 302, the car phone 302 may be used to perform a number of activities based on its capabilities and limitations and the user phone credentials. For example, the car phone 302 may be used for telephone calls using the base phone plan or a third party application (e.g., Skype, etc.) as provided through the user phone credentials and supported by the car phone capabilities. A communication link between the two computing devices may be maintained in order for the remoting of the credentials to remain active and that the borrowed credentials are not invalidated.

It is contemplated that embodiments of the present invention are not limited to cellular phones or cars that are referenced here merely as examples and that they are compatible with any number and type of computing devices (other than the cellular phones 302, 304) and/or locations (other than the car 312), such as buildings, sport stadiums, etc. For example, the user 306 may be an individual in a basement of a building (as opposed to being in the car 312) wanting to use his tablet computer (as opposed to the user phone 304) through a desktop/server/laptop computer (as opposed to the car phone 302) that is placed in the building to reach a better reception through an antenna installed on the exterior of the building (as opposed to the car antenna 316 installed on the exterior of the car 312).

Figure 4:
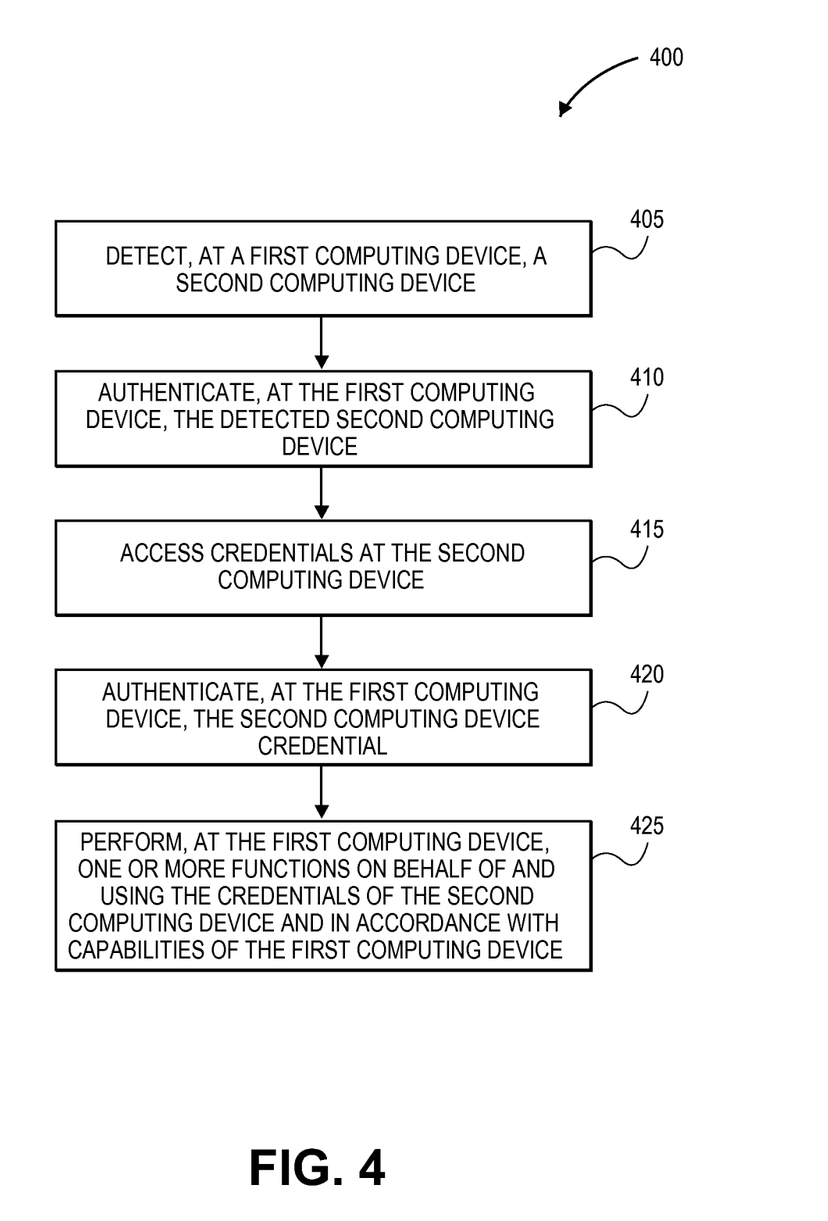
FIG. 4 illustrates a method for facilitating remote access of user and device credentials using a remote access mechanism according to one embodiment of the invention.

FIG. 4 illustrates a method for facilitating remote access of user and device credentials at computing devices using a remote access mechanism according to one embodiment of the invention. Method 400 may be performed by processing logic that may comprise hardware (e.g., circuitry, dedicated logic, programmable logic, etc.), software (such as instructions run on a processing device), or a combination thereof. In one embodiment, method 400 may be performed by the remote access mechanism of FIG. 1.

Method 400 starts at block 405 with a first computing device (e.g., a car-installed cellular phone) to detecting a second computing device (e.g., a user cellular phone). In one embodiment, the second computing device may be automatically detected when the two computing devices are within a predefined range (e.g., any user-defined range, an automatic range, such as the Bluetooth signal range) of each other. At block 410, the first computing device to authenticate the detected second computing device. At block 415, the first computing device accesses the second computing device's credentials. In one embodiment, the second computing device credentials may be transmitted on to the first computing device where they are received and accessed. At block 420, in one embodiment, the second computing device credentials are authenticated by the first computing device. At block 425, in one embodiment, by lending or remoting its credentials to the first computing device, the first computing device may be used to perform one or more functions on behalf of and using the credentials of the second computing device. A communication link between the two computing devices may be maintained in order for the remoting of the credentials to remain active and that the borrowed credentials are not invalidated.

Figure 5:
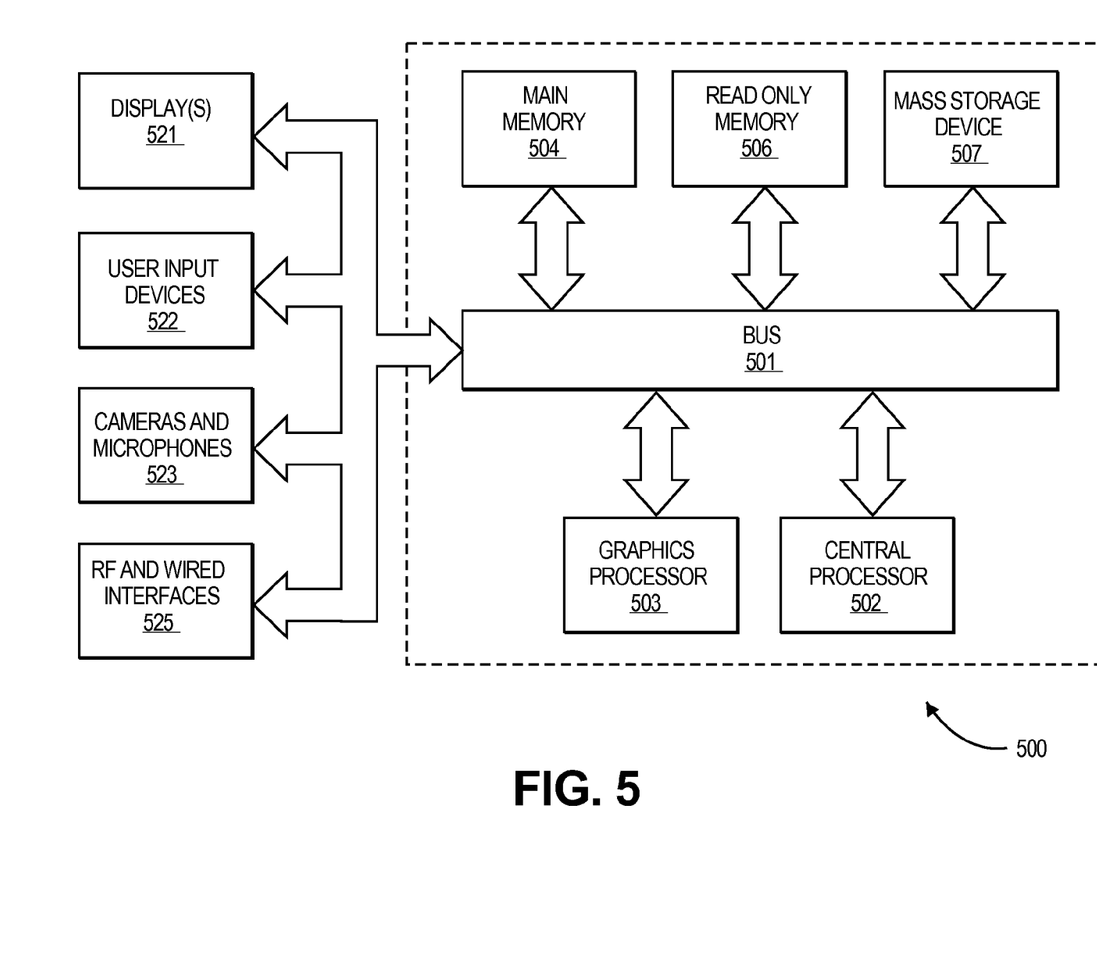
FIG. 5 illustrates a computing system according to one embodiment of the invention.

FIG. 5 illustrates a computing system 500 employing and facilitating a remote access mechanism according to one embodiment of the invention. The exemplary computing system 500 may be the same as or similar to the computing system 100 of FIG. 1 may include personal computer, cellular phone, tablet computers, set-top boxes, gaming console, portable gaming device, etc. The computer system 500 includes a bus or other communication means 501 for communicating information, and a processing means such as a microprocessor 502 coupled with the bus 501 for processing information. The computer system 500 may be augmented with a graphics processor 503 for rendering graphics through parallel pipelines and may be incorporated into one or more central processor(s) 502 or provided as one or more separate processors.

The computer system 500 further includes a main memory 504, such as a random access memory (RAM) or other dynamic data storage device, coupled to the bus 501 for storing information and instructions to be executed by the processor 502. The main memory also may be used for storing temporary variables or other intermediate information during execution of instructions by the processor. The computer system 500 may also include a nonvolatile memory 506, such as a read only memory (ROM) or other static data storage device coupled to the bus 501 for storing static information and instructions for the processor.

A mass memory 507 such as a magnetic disk, optical disc, or solid state array and its corresponding drive may also be coupled to the bus 501 of the computer system 500 for storing information and instructions. The computer system 500 can also be coupled via the bus to a display device or monitor 521, such as a Liquid Crystal Display (LCD) or Organic Light Emitting Diode (OLED) array, for displaying information to a user. For example, graphical and textual indications of installation status, operations status and other information may be presented to the user on the display device 521, in addition to the various views and user interactions discussed above.

Typically, user input devices 522, such as a keyboard with alphanumeric, function and other keys, may be coupled to the bus 501 for communicating information and command selections to the processor 502. Additional user input devices 522 may include a cursor control input device such as a mouse, a trackball, a trackpad, or cursor direction keys can be coupled to the bus for communicating direction information and command selections to the processor 502 and to control cursor movement on the display 521.

Camera and microphone arrays 523 are coupled to the bus 501 to observe gestures, record audio and video and to receive visual and audio commands as mentioned above.

Communications interfaces 525 are also coupled to the bus 501. The communication interfaces may include a modem, a network interface card, or other well-known interface devices, such as those used for coupling to Ethernet, token ring, or other types of physical wired or wireless attachments for purposes of providing a communication link to support a local or wide area network (LAN or WAN), for example. In this manner, the computer system 500 may also be coupled to a number of peripheral devices, other clients, or control surfaces or consoles, or servers via a conventional network infrastructure, including an Intranet or the Internet, for example.

It is to be appreciated that a lesser or more equipped system than the example described above may be preferred for certain implementations. Therefore, configuration of the computing system 500 may vary from implementation to implementation depending upon numerous factors, such as price constraints, performance requirements, technological improvements, or other circumstances.

Embodiments may be implemented as any or a combination of: one or more microchips or integrated circuits interconnected using a parent-board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware, such as firmware.

Embodiments may be provided, for example, as a computer program product which may include one or more machine-readable media, such as a non-transitory machine-readable medium, having stored thereon machine-executable instructions that, when executed by one or more machines such as a computer, such as computing system 500, network of computers, or other electronic devices, may result in the one or more machines carrying out operations in accordance with embodiments of the present invention. A machine-readable medium may include, but is not limited to, floppy diskettes, optical disks, Compact Disc-Read Only Memories (CD-ROMs), and magneto-optical disks, Read-Only Memories (ROMs), Random-Access Memories (RAMs), Erasable Programmable Read-Only Memories (EPROMs), EEPROMs Electrically Erasable Programmable Read-Only Memories (EEPROMs), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

In the foregoing specification, the invention has been described with reference to specific exemplary embodiments thereof. It will, however, be evident that various modifications and changes may be made thereto without departing from the broader spirit and scope of the invention as set forth in the appended claims. The Specification and drawings are, accordingly, to be regarded in an illustrative rather than a restrictive sense.

I claim:

1. A computer-implemented method comprising:
   detecting, by a first computing device, a second computing device having credentials capable of facilitating one or more tasks, wherein the first computing device lacks the credentials and is incapable of performing the one or more tasks, wherein the first computing device is incapable due to lacking one or more features or being un-favoured due to one or more preferences to perform the one or more tasks;

remotely accessing, by the first computing device, the credentials at the second computing device such that accessing the credentials to turn the first computing device into temporarily gaining capacity to be capable of performing the one or more tasks based on the credentials of the second computing device; and performing, by the first computing device, the one or more tasks based on the credentials at the second computing device without the first computing device having to employ the credentials or permanently gain the capacity, wherein the credentials include one or more of communication credentials, user preferences, one or more voice plans, and one or more data plans, and wherein the one or more tasks include voice calling, over a communication medium, based on the one or more phone plans at the second computing device, accessing data, over one the communication medium, based on the one or more data plans at the second computing device, wherein performing further includes facilitating the second computing device to perform the one or more tasks on behalf of the first computing device without the first computing device having to employ the credentials or permanently gain the capacity.

2. The computer-implemented method of claim 1, further comprising:
automatically triggering the remote access of the credentials when the first and second computing devices are within a pre-determined range of each other; and
authenticating the credentials at the second computing device before allowing the first computing device to access the credentials.

3. The computer-implemented method of claim 1, wherein the credentials comprise a permission to perform the one or more tasks, wherein the credentials further comprise one or more of user profiles, service provider profiles, and security details, wherein the communication credentials include at least one of the one or more voice plans and the one or more data plans for offering phone services and data services, respectively, wherein the communication medium comprises one or more communication networks including one or more of a proximity network, a cloud network, an intranet, and the Internet, wherein the phone services include at least one of conventional phone services or Voice over Internet Protocol (VoIP).

4. The computer-implemented method of claim 1, further comprising receiving, at the first computing device, the credentials including the communication credentials from the second computing device.

5. The computer-implemented method of claim 1, wherein the first and second computing devices comprise mobile computing devices including one or more of smartphones, dumb cellular phones, personal digital assistants (PDAs), handheld computers, e-readers, tablet computers, notebooks, netbooks, desktop computers, and set-top boxes, wherein the first computing device is employed at an automobile, the first computing device comprising a car phone, and wherein the second computing device comprises a cellular phone including a smartphone or a dumb cellular phone.

6. The computer-implemented method of claim 1, wherein the one or more features or the one or more preferences include at least one of one or more of battery life, signal strength, network strength or bandwidth, antenna strength or locations, service provider limitation, system limitation, security protocol, phone plan type or deficiencies, data plan type or deficiencies, and user preferences.

7. A non-transitory machine-readable medium comprising instructions that, when executed by a processing device of a first computing device, cause the processing device to:
detect a second computing device having credentials capable of facilitating one or more tasks, wherein the first computing device lacks the credentials and is incapable of performing the one or more tasks, wherein the first computing device is incapable due to lacking one or more features or being un-favoured due to one or more preferences to perform the one or more tasks;
remotely access the credentials at the second computing device such that accessing the credentials to turn the first computing device into temporarily gaining capacity to be capable of performing the one or more tasks based on the credentials of the second computing device; and
perform the one or more tasks based on the credentials at the second computing device without the first computing device having to employ the credentials or permanently gain the capacity, wherein the credentials include one or more of communication credentials, user preferences, one or more voice plans, and one or more data plans, and wherein the one or more tasks include voice calling, over a communication medium, based on the one or more phone plans at the second computing device, accessing data, over one the communication medium, based on the one or more data plans at the second computing device, wherein performing further includes facilitating the second computing device to perform the one or more tasks on behalf of the first computing device without the first computing device having to employ the credentials or permanently gain the capacity.

8. The non-transitory machine-readable medium of claim 7, wherein the processing device is further to:
automatically trigger the remote access of the credentials when the first and second computing devices are within a pre-determined range of each other; and
authenticate the credentials at the second computing device before allowing the first computing device to access the credentials.

9. The non-transitory machine-readable medium of claim 7, wherein the credential comprise a permission to perform the one or more tasks, wherein the credentials further comprise one or more of user profiles, service provider profiles, and security details, wherein the communication credentials include at least one of the one or more voice plans and the one or more data plans for offering phone services and data services, respectively, wherein the communication medium comprises one or more communication networks including one or more of a proximity network, a cloud network, an intranet, and the Internet, wherein the phone services include at least one of conventional phone services or Voice over Internet Protocol (VoIP).

10. The non-transitory machine-readable medium of claim 7, wherein the processing device is further to receive the credentials including the communication credentials from the second computing device.

11. The non-transitory machine-readable medium of claim 7, wherein the first and second computing devices comprise mobile computing devices including one or more of smartphones, dumb cellular phones, personal digital assistants (PDAs), handheld computers, e-readers, tablet computers, notebooks, netbooks, desktop computers, and set-top boxes, wherein the first computing device is employed at an automobile, the first computing device comprising a car phone, and wherein the second computing device comprises a cellular phone including a smartphone or a dumb cellular phone.

12. The non-transitory machine-readable medium of claim 7, wherein the one or more features or the one or more preferences include at least one of one or more of battery life, signal strength, network strength or bandwidth, antenna strength or locations, service provider limitation, system limitation, security protocol, phone plan type or deficiencies, data plan type or deficiencies, and user preferences.

13. An apparatus comprising:
a first computing device comprising:
device detection module to detect a second computing device having credentials capable of facilitating one or more tasks, wherein the first computing device lacks the credentials and is incapable of performing the one or more tasks, wherein the first computing device is incapable due to lacking one or more features or being un-favoured due to one or more preferences to perform the one or more tasks;
credentials access module to remotely access the credentials at the second computing device such that accessing the credentials to turn the first computing device into temporarily gaining capacity to be capable of performing the one or more tasks based on the credentials of the second computing device; and
one or more components to perform the one or more tasks based on the credentials, wherein the credentials include one or more of communication credentials, user preferences, one or more voice plans, and one or more data plans, and wherein the one or more tasks include voice calling, over a communication medium, based on the one or more phone plans at the second computing device, accessing data, over one the communication medium, based on the one or more data plans at the second computing device, wherein performing further includes facilitating the second computing device to perform the one or more tasks on behalf of the first computing device without the first computing device having to employ the credentials or permanently gain the capacity.

14. The apparatus of claim 13, wherein the credentials access module is further to:
automatically trigger the remote access of the credentials when the first and second computing devices are within a pre-determined range of each other; and
authenticate the credentials at the second computing device before allowing the first computing device to access the credentials.

15. The apparatus of claim 13, wherein the credentials comprise a permission to perform the one or more tasks, wherein the credentials further comprise one or more of user profiles, service provider profiles, and security details, wherein the communication credentials include at least one of the one or more voice plans and the one or more data plans for offering phone services and data services, respectively, wherein the communication medium comprises one or more communication networks including one or more of a proximity network, a cloud network, an intranet, and the Internet, wherein the phone services include at least one of conventional phone services or Voice over Internet Protocol (VoIP).

16. The apparatus of claim 13, wherein the credentials access module is further to receive, at the first computing device, the credentials including the communication credentials from the second computing device.

17. The apparatus of claim 13, wherein the first and second computing devices comprise mobile computing devices including one or more of smartphones, dumb cellular phones, personal digital assistants (PDAs), handheld computers, e-readers, tablet computers, notebooks, netbooks, desktop computers, and set-top boxes, wherein the first computing device is employed at an automobile, the first computing device comprising a car phone, and wherein the second computing device comprises a cellular phone including a smartphone or a dumb cellular phone.

18. The apparatus of claim 13, wherein the one or more features or the one or more preferences include at least one of one or more of battery life, signal strength, network strength or bandwidth, antenna strength or locations, service provider limitation, system limitation, security protocol, phone plan type or deficiencies, data plan type or deficiencies, and user preferences.

* * * * *